United States Patent [19]

Lee et al.

[11] Patent Number: 5,808,891
[45] Date of Patent: Sep. 15, 1998

[54] METHOD FOR CREATING A DIRECT HOT CHARGE ROLLING PRODUCTION SCHEDULE AT A STEEL PLANT

[75] Inventors: Ho Soo Lee; Mark Elliot Trumbo, both of Mount Kisco, N.Y.

[73] Assignee: International Business Machines Corporation, Armonk, N.Y.

[21] Appl. No.: 688,573

[22] Filed: Jul. 30, 1996

[51] Int. Cl.⁶ .................................................. G05B 19/42
[52] U.S. Cl. ............................... 364/468.15; 364/468.05; 364/468.06; 364/472.02; 364/472.04; 395/50; 395/51
[58] Field of Search ............................ 364/468.15, 188, 364/472.01, 148, 472.02, 472.03, 472.04, 472.05, 468.06; 395/650, 50–51, 60–61; 72/200, 202; 29/527.7; 164/459, 460, 461, 462, 463, 464

[56] References Cited

U.S. PATENT DOCUMENTS

| 4,745,556 | 5/1988 | Truley .................................... 364/472 |
| 5,133,205 | 7/1992 | Rostik et al. ............................. 72/200 |
| 5,396,695 | 3/1995 | Ginzburg et al. ...................... 29/527.7 |
| 5,408,663 | 4/1995 | Miller ..................................... 395/650 |
| 5,419,172 | 5/1995 | Kim ......................................... 72/202 |
| 5,467,519 | 11/1995 | Tippins et al. ......................... 29/527.7 |
| 5,490,315 | 2/1996 | Kostopolos et al. .................. 29/527.7 |
| 5,630,467 | 5/1997 | Yoshimura et al. .................... 164/468 |
| 5,657,814 | 8/1997 | Maebara et al. ........................ 164/452 |

*Primary Examiner*—Reba I. Elmore
*Assistant Examiner*—Ramesh Patel
*Attorney, Agent, or Firm*—Scully, Scott, Murphy & Presser; Stephen C. Kaufman, Esq.

[57] ABSTRACT

A scheduling method suitable for use in a primary steel production area operating in either direct rolling or direct hot charge rolling modes, collectively referred to as synchronized rolling. The steel production area comprising a continuous caster, for input of slabs to a hot strip mill. An order load for some finite period (e.g. one week) is received as input to the method. The method generates a caster schedule and a hot strip mill schedule which fills the order load with the objective of operating the continuous caster and the hot strip mill with minimal interruption. The generated schedule works within the constraints imposed by both the continuous caster and the hot strip mill. The schedule generation process also considers key operating constraints of individual facilities as well as those on which the facility has dependencies. The schedule also addresses objectives such as maximizing throughput, maximizing on-time delivery, and minimizing operating costs.

8 Claims, 6 Drawing Sheets

METHOD FOR CREATING A DIRECT HOT CHARGE ROLLING PRODUCTION SCHEDULE AT A STEEL PLANT

FIELD OF THE INVENTION

This invention relates to a scheduling method suitable for use in a primary steel production area comprising a continuous caster for input of slabs to a hot strip mill.

INTRODUCTION TO THE INVENTION

A primary area in steel plants comprises continuous casters and hot strip mills (HSM). This invention describes a novel method for generating production schedules for the primary area of integrated steel plants operating in either direct rolling or direct hot charge rolling modes, where the slabs coming out of a caster maintain the same sequence for rolling at an HSM. In this invention, direct rolling and direct hot charge rolling are collectively referred to as synchronized rolling (SR). The demand for the SR scheduling technique has been very high for the last several years, but the scheduling technique is not presently known.

BACKGROUND OF THE INVENTION

In this section, we provide a brief description of the steel making process and its associated rolling modes.

PRIMARY STEELMAKING PROCESSES

We first describe the key facilities, and the relevant information associated with them. Throughout this section we refer to FIG. 1, numeral 10.

Although the operating environment is different from one steel mill to another, the configuration shown in FIG. 1 is common to most integrated steel mills producing flat rolled products.

FIG. 1 shows a blast furnace 12 whose capacity is mostly constant, one or more basic oxygen furnaces 14 and secondary refining facilities to convert iron to steel of the desired grade, a continuous caster 16 that can convert the steel into slabs of roughly the correct width and length, and a hot strip mill 18 that can roll the slabs to produce coils of the desired gauge and width. A detailed description of each now follows.

BASIC OXYGEN FURNACE

A pool of blast furnaces jointly provides the molten iron needs for the basic oxygen furnace (BOF). In a BOF, molten iron may be combined with scrap to produce molten steel, and oxygen may be blown into the mixture for a specified time to convert the contents into steel. The BOF allows alloys to be added to the input molten iron to arrive at molten steel with specific target chemistry ranges for an intended product. A BOF batch is called a heat.

From the BOF, a ladle of steel is sent either to the secondary refining facilities, where the chemistry of the steel is further refined or directly to a caster. An LMF can also be used as a holding area for the caster, so that an appropriate temperature of the steel can be achieved and maintained. The ladle is then sent to the caster.

CONTINUOUS CASTER

The molten steel produced at BOF is poured into a tundish via a ladle. The steel takes solid form at the continuous caster, which accepts molten steel from a tundish and guides the flow of molten steel through a series of molds so that the steel attains solid state as a continuous rectangular section.

The mold width may be adjusted to accommodate variability in slab width. However, width changes should be made gradually; they are typically limited to 2 inches between adjacent slabs and 4 inches between the tundishes. After a certain number of heats are processed, or when the grades of two adjacent heats can not be mixed, the tundish needs to be removed and re-lined, which is an expensive process. The slabs from the caster are sent either directly to the HSM, or to intermediate storage such as a hot soaking pit or the slab yard.

When a radical width change (more than two inches, for example) cannot be avoided, if maintenance needs to be done, or if there is no more hot metal from the upstream facilities the caster must be emptied of hot metal and reset. This is called a turnaround.

We call a sequence of tundishes, or the batch on the caster between caster turnarounds, a caster string.

HOT STRIP MILL

The HSM rolls the slabs received from the caster. Here, a slab is passed through a series of rolling operations to attain the required thickness, or gauge, of the flat sheet steel product. The rolling operation reduces thickness by elongating a slab, with only minor modification to the width of the slab.

Hot rolling requires a slab with high temperature. Hence, if the mill configuration is such that the slab cools below the rolling temperature before it is transferred to the HSM, some reheating is needed; the slabs are sent to a walking beam furnace 20 to raise the slab temperature. Reheated slabs are then rolled in the mill to the desired thickness.

Slabs are grouped such that they can be rolled together between finishing roll changes. Those groups are called rounds. The group types are based on factors like width range, gauge range, and hardness.

MODES OF ROLLING

The rolling operation in the primary production area can differ significantly from one steel plant to another. Furthermore, one plant may be operating under one or a combination of the following three rolling modes. They are characterized by how the casters and HSM are linked, as shown in FIG. 1.

COLD CHARGE

The slabs coming off the caster are sent to a slab yard. They are then collected into rounds that are run together on the hot strip mill. This mode of operation has the advantage that scheduling is greatly simplified. It is possible to run the two machines at very close to optimum capacity utilization, as they do not interfere with each other. The disadvantage is that reheat costs, inventory costs, and slab handling costs are very high.

HOT CHARGE

In this mode of operation, there is a conscious attempt to reduce the time spent by a slab between the caster and HSM. Slabs are allowed to wait for a limited time (8 to 16 hours) in intermediate insulated chambers before rolling. They are then reheated and rolled. Such a mode of operation can reduce the reheat costs by about 50%, and reduce inventory and handling costs.

DIRECT HOT CHARGE

The steel industry has recognized for some time that it is desirable to take slabs as they come off the continuous caster, reheat them only slightly if needed, and then roll them in the HSM; this is called direct hot charging. In this case, the slabs coming out of the caster maintain the same sequence for rolling at the HSM. This forces the caster to be completely synchronized with the HSM. Many facilities in the world have been set up with this aim in mind. However, only a handful of plants in the world have successfully implemented direct hot charging. The reason for this is that scheduling a plant to perform direct hot charge is extremely difficult.

DIRECT ROLLING

It is the same as direct hot charge rolling, except that the slabs produced at the continuous caster do not need to be reheated at the reheating furnace before rolling at HSM. Therefore, as in direct hot charge rolling, the slabs coming out of the continuous caster maintain the same sequence for rolling at the HSM. This forces the caster to be completely synchronized with the HSM. Steel makers have experienced the same difficulties as direct hot charge rolling in creating schedules for direct rolling.

SUMMARY OF THE INVENTION

PROBLEM STATEMENT

The scheduling preferably begins from a state where the load for a finite period, (normally one week or ten days), has been determined for all important facilities in the primary steel production area by an external planning function. The scheduling system performs scheduling of the finite duration for the casters and the HSM.

We note that a difficulty with synchronous rolling is that it requires the caster and the hot strip mill to operate in lock-step. However, the constraints considered by the caster and the hot strip mill are different. For example, these include:

The continuous caster is primarily concerned with steel chemistry. A heat of material has to all be of the same grade. Sequential heats within a tundish should be of a compatible grade. A typical steel mill can make between 200 and 500 grades.

The HSM is concerned that slabs in a sequence lie in the same round type, determination of which is made primarily based on hardness and by gauge.

The schedule generation process takes into account key operating constraints of individual facilities as well as those on which the facility of interest has dependencies. It also addresses objectives such as maximizing throughput, maximizing on-time delivery, and minimizing operating costs.

ISSUES IN SYNCHRONIZED ROLLING SCHEDULING

The primary driver to the scheduling process is the set of orders planned for each week for the HSM. The attributes for the orders may include the following: order number, priority, metallurgical grade, eligible round types, hot band gauge, hot band width, and number of slabs.

The problem of scheduling orders for a caster and hot strip mill operating synchronously involves grouping orders on the basis of attributes that allow the caster and the HSM to cast and roll slabs without interruption.

In SR, the sequence of slabs produced by the caster must also be an acceptable input sequence to the HSM, without exchanging the order of any slabs between the units. However, for any stock slabs that are inserted into the caster sequence (i.e., slabs not associated with a customer order, introduced strictly to provide smooth width transitions or to "round up" the amount of steel in a particular grade to a whole number of heats), the option exists to divert the stock cast slabs into inventory, rather than to route them directly into the HSM. In this case, the hot strip mill sequence would miss some of the slabs produced by the caster, but the remaining slabs would still remain in the same order in which they were cast, and would still have to satisfy the constraints of a hot strip mill sequence.

OBJECTIVES

The goal of SR scheduling is to sequence the orders so that the constraints are not violated and to find multiple solutions that span the space of objectives:

Maximize the tundish utilization by using it either for a single grade or multiple compatible grades.

Maximize the efficiency of roll usage in the HSM.

Minimize the required tonnage of stock slabs that must be added to produce slabs that are sequenceable at the caster. This is equivalent to maximizing the direct hot charged tonage.

Maximize the sum of the priorities of the orders included in the schedule.

Minimize the number of turnarounds.

Minimize the tardiness, or, equivalently, maximize on-time delivery.

It is most likely that one cannot simultaneously optimize all of them. Spanning the space with a non-dominated set is the preferred approach, because it allows the user to make the final decision among the best solutions.

As an example of the non-dominated set, consider a problem with two objectives, objective 1 and objective 2. The following FIG. 2, numeral 22 shows how new solutions are handled, where we assume that we already have three non-dominated solutions, A, B, and C.

Whenever a new solution is created, the following events occur depending on the two objectives of the new solution:

When the two objectives fall in any cells labeled as add to set, the new solution is a non-dominated solution and is kept. It may be the case that some existing non-dominated solutions become dominated by the new one, and so these are removed from the set.

When the two objectives fall in the ignore region the new solution is a dominated solution and discarded.

The benefit of generating a non-dominated set of solutions is that one can decide in advance which features of a solution are important, allow the algorithm to generate solutions which span these features, but allow a human to make the decision about which particular solution is best.

CONSTRAINTS

In principle, for synchronized rolling, pieces within a round should be sequenceable at the HSM without violating width or gauge change limits between consecutive pieces, while keeping the same sequence as they are produced on the caster.

At Casters

Steel grades within a tundish must be compatible (subject to criteria for mixing grades) but any two grades can follow each other when the tundish changes.

Width change between slabs at the caster should not exceed a specified maximum.

The slabs produced on the two strands should have the same width.

The slabs produced on each strand of the caster should go from wide to narrow.

Tundish utilization must not exceed the maximum specified by grade.

At The Hot Strip Mill

A round can be as small as one heat and as large as the maximum number of pieces constituting the effective roll life for this type of round on the HSM.

A round must be a multiple of heats.

The gauge of a subsequent coil may decrease only up to a specified maximum, but any gauge increase is allowed.

The maximum number of slab pieces to be rolled within a specified width range should not exceed a predetermined number.

After a planned HSM maintenance, the next round must be a specific roll type.

Precedence constraints among round types must be respected.

The schedule must include the maintenance time window.

Prior Art

To the best of our knowledge, no prior art has been known or reported that can create a synchronized rolling production schedule. Steel production scheduling techniques at the primary area made known so far can create either continuous caster schedules or HSM schedules, but not both in a synchronized way.

We have now discovered a novel scheduling method suitable for use in a primary steel production area which addresses and solves the problem identified above, while meeting the specified objectives without violations of the noted constraints.

The method comprises the steps of:
1) creating both a continuous caster schedule and a hot strip mill schedule in a synchronized manner; for
2) enabling the continuous caster and the hot strip mill to process and roll slabs without interruption.

The invention as defined can realize significant advantages, including inter alia:
  providing close to 100% SR schedule, thereby cutting down inventory, reheat and handling costs.
  including a set of heuristics to satisfy operational constraints, and to yield solutions of near-optimal quality.
  providing multiple alternative schedules so that the user can choose one based on operation/business situations.

BRIEF DESCRIPTION OF THE DRAWING

The invention is illustrated in the accompanying drawing, in which.

DETAILED DESCRIPTION OF THE INVENTION

Figure 1:
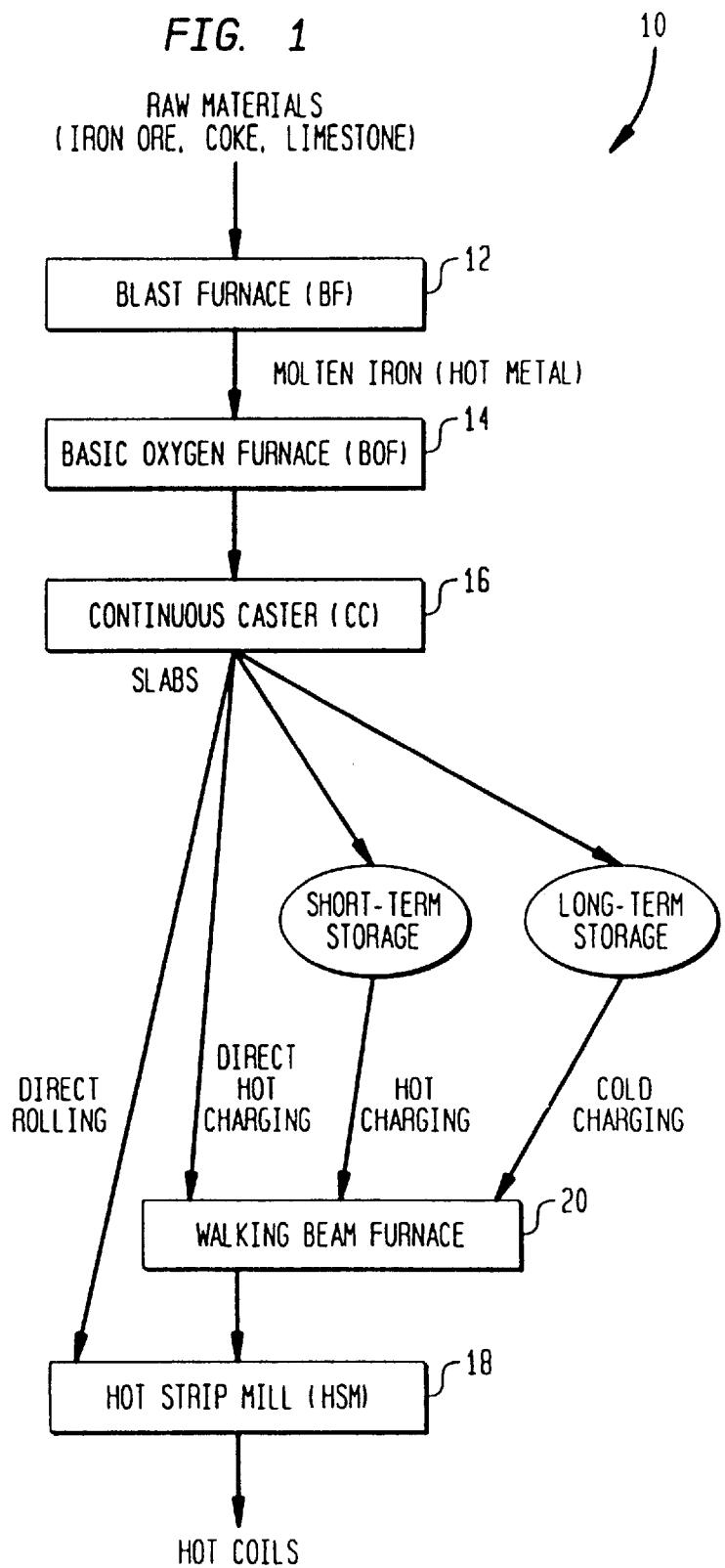
FIG. 1 shows key facilities in steel making and different rolling modes.
Figure 2:
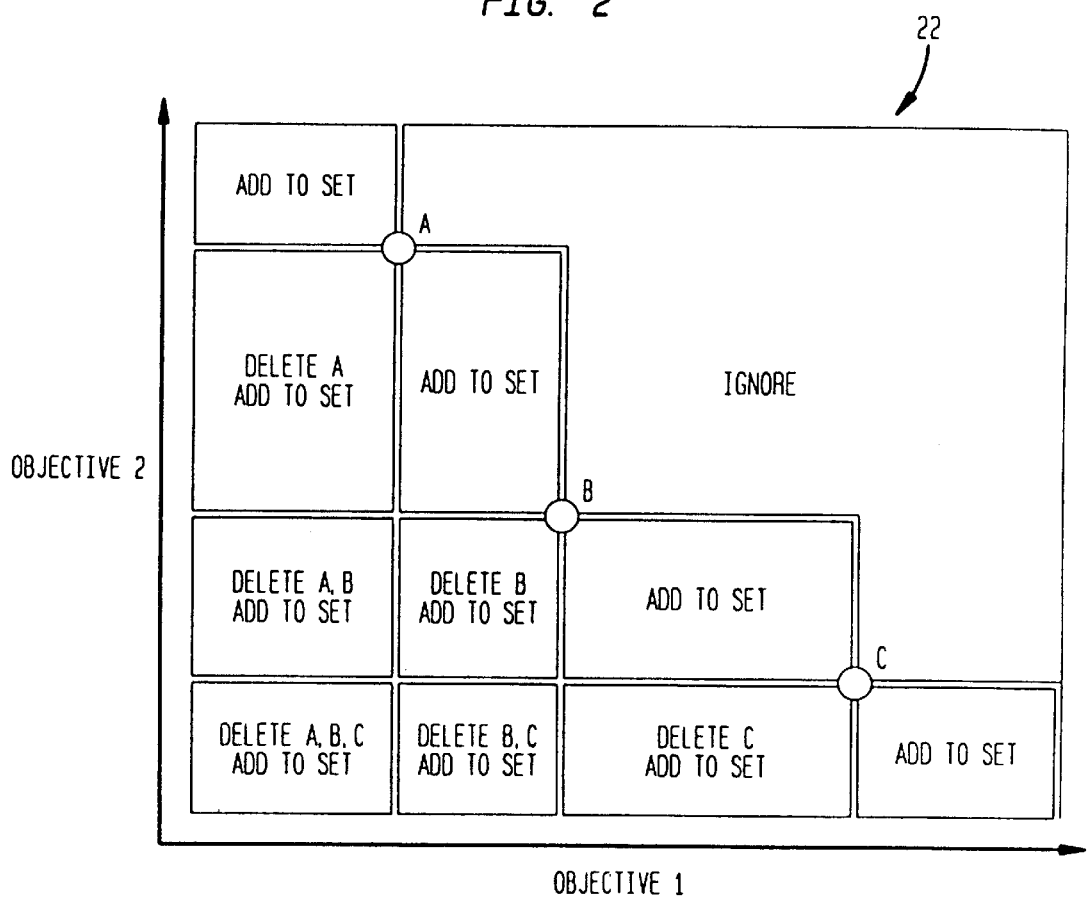
FIG. 2 provides an example of a non-dominated set.
Figure 3:
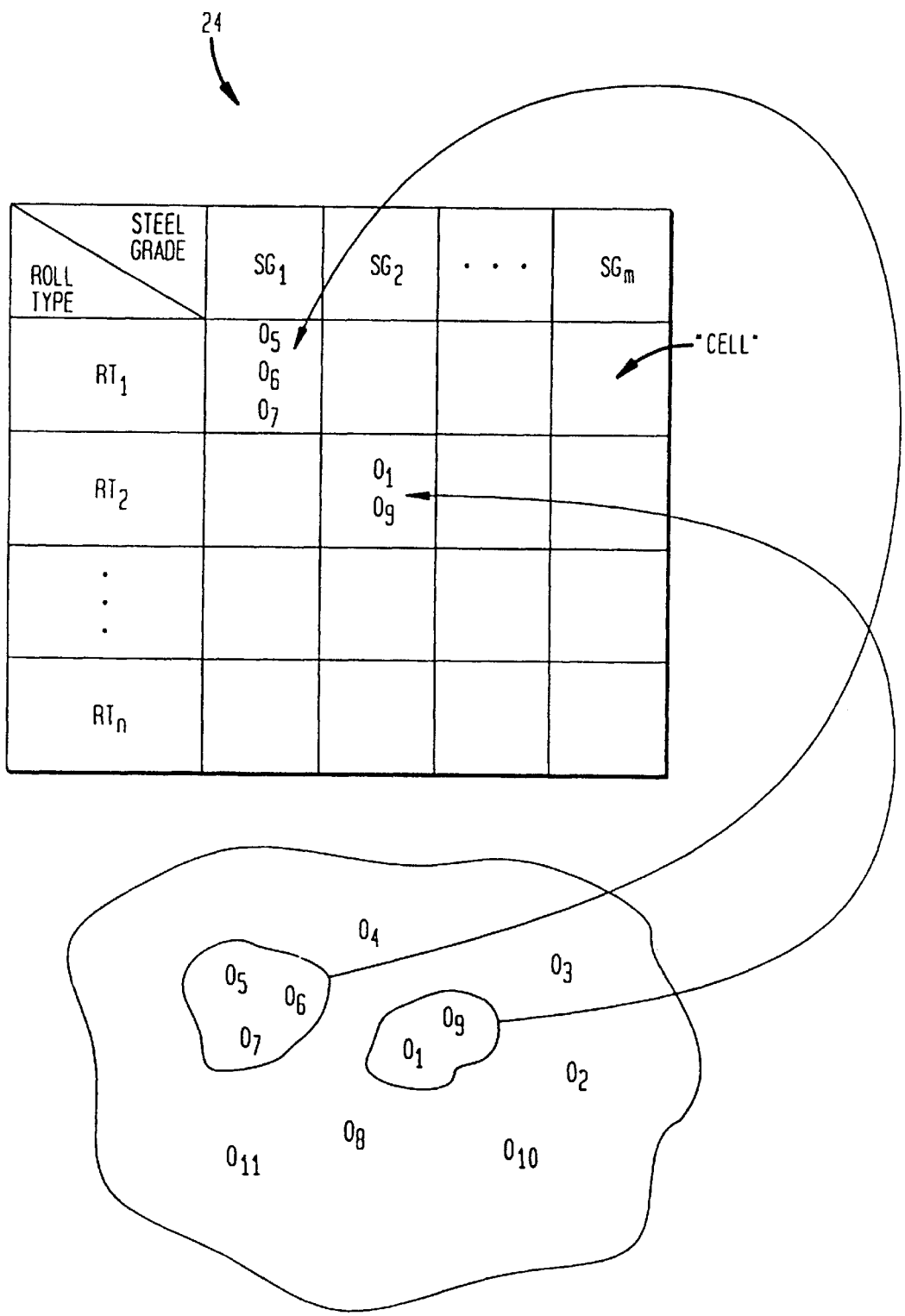
FIG. 3 shows an example of an order book matrix table.

For efficient scheduling, we preferably adhere to the following principles
  Schedules are created directly from an order book, not from massaged data such as lots or clusters.
  Scheduling is performed neither upstream nor downstream. It is done while considering the caster and the HSM scheduling simultaneously.
  Prior to the scheduling, the large orders may be partitioned into a set of smaller suborders. During the scheduling process, when necessary, we update the order book such that suborders included in the segments, rounds, schedules, or bridging (gap-filling) materials are marked in the order book to signify that they have been already used.
  Both round types and cast grades are ordered for the scheduling purpose. This is achieved by forming a matrix of cast grade and round type and sorting the current and past due orders into the cells. See FIG. 3, numeral 24. Note that some orders can be rolled in more than one round type. Rules for visiting rows and cells preferably are as follows:
  The table is visited by rows in order of increasing row weight.
  The cells within a row are visited in order of increasing cell weight.

The main scheduling is done in the following steps.

Steps for Synchronized Rolling Schedule

Figure 4:
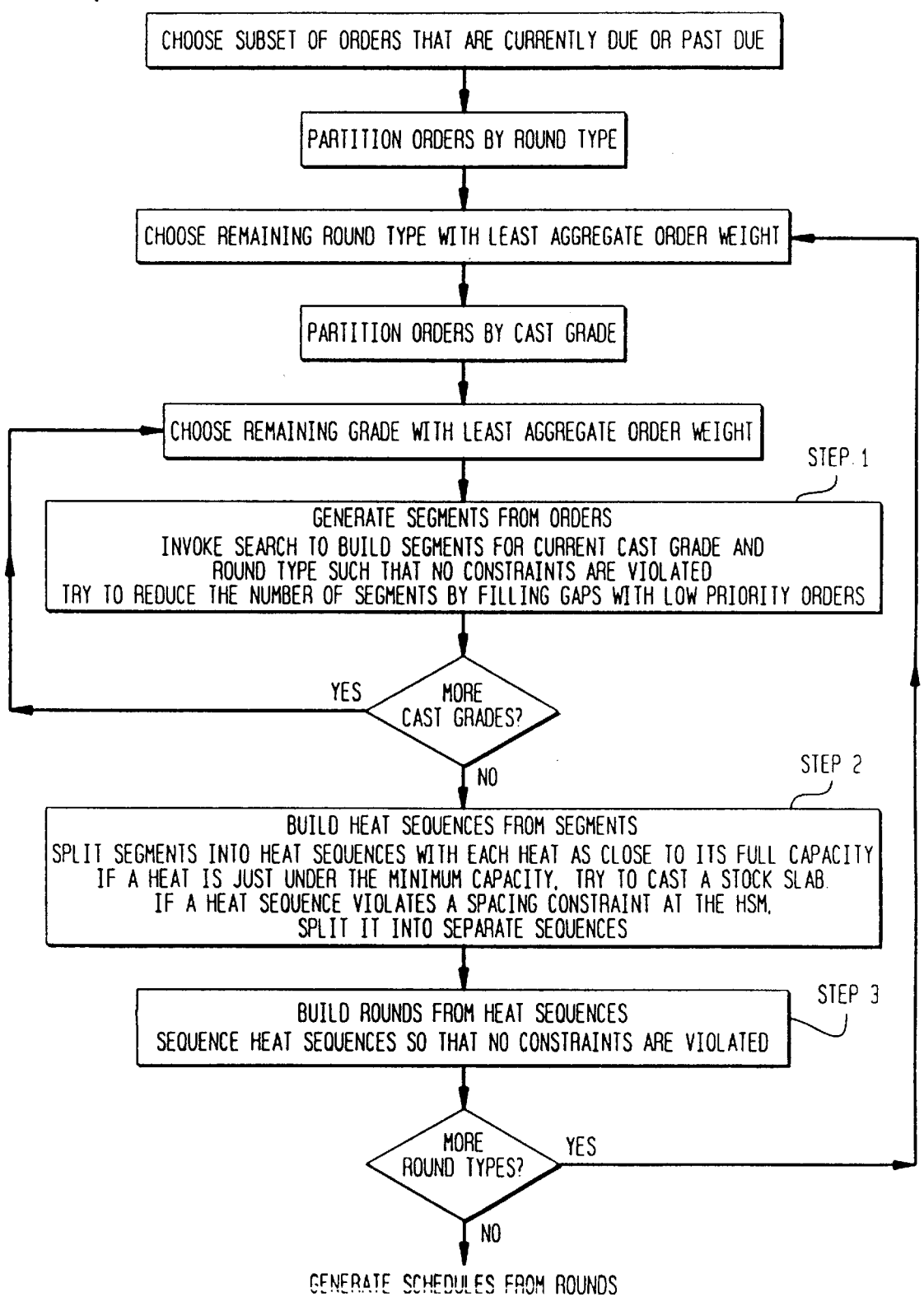
FIGS. 4 and 5 show a flow diagram of steps of the invention.

For each round type, do from Step 1 to Step 3 (as depicted in FIG. 4, numeral 26)

Step 1 Build segments from suborders
  1. For a particular cast grade and round type (within a particular cell), use a search to form a set of simple segments that do not violate constraints. A segment is a sequence of suborders.
  2. Use spread and squeeze to make longer segments.
  3. Pull in low-priority orders to make longer segments.

Step 2 Build heat sequences from segments
  1. Split segments into heat sequences with each heat as close to its full capacity as possible.
  2. If a heat is just under pre-determined minimum weight, try to cast a stock slab.
  3. If heat sequence violates any spacing constraints at HSM, split into separate heat sequences.

Step 3 Build rounds from heat sequences
  1. For a particular round type (a row), concatenate heat sequences so that width, gauge, and other HSM spacing constraints are not violated.
  2. Try to minimize grade changes.
  3. Use spread and squeeze to make longer rounds.

Figure 5:
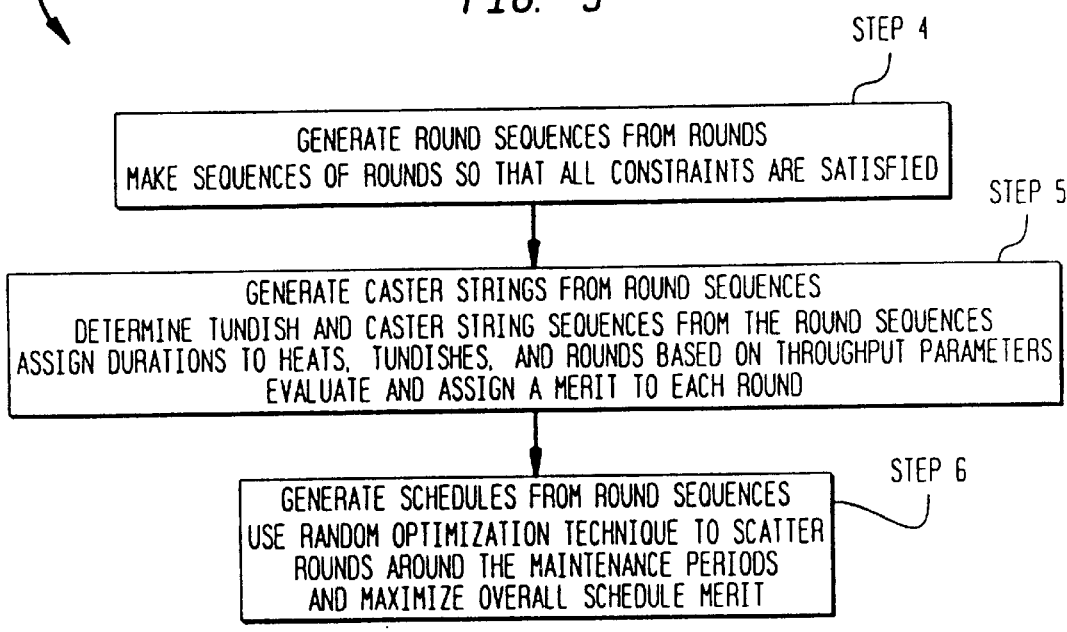

When sets of rounds for all round types are generated, then do Step 4 through Step 6 (as depicted in FIG. 5, numeral 28)

Step 4 Build round sequences from rounds. From the set of rounds, make sequences of rounds so that width, gauge, and other HSM spacing constraints are not violated.

Step 5 Build caster strings from round sequences
  1. Determine tundish and caster string boundaries from the round sequences.
  2. Use information about caster and HSM throughput to assign durations to heats, tundishes, and rounds.
  3. Assign a merit to each round sequence.

Step 6 Build schedules from round sequences. Use a random optimization technique such as the Monte Carlo method to include scheduled maintenance periods and the round sequences so that the maintenance is in the right place and the overall merit of the solution is maximized.

Spread and squeeze is a technique whereby we can cast a slab slightly wider or narrower than would be required by the specified width and gauge, assuming that the difference will be made up by either spreading or squeezing in the HSM.

We do this repeatedly, throwing out the bad solutions and keeping the good solutions.

Figure 6:
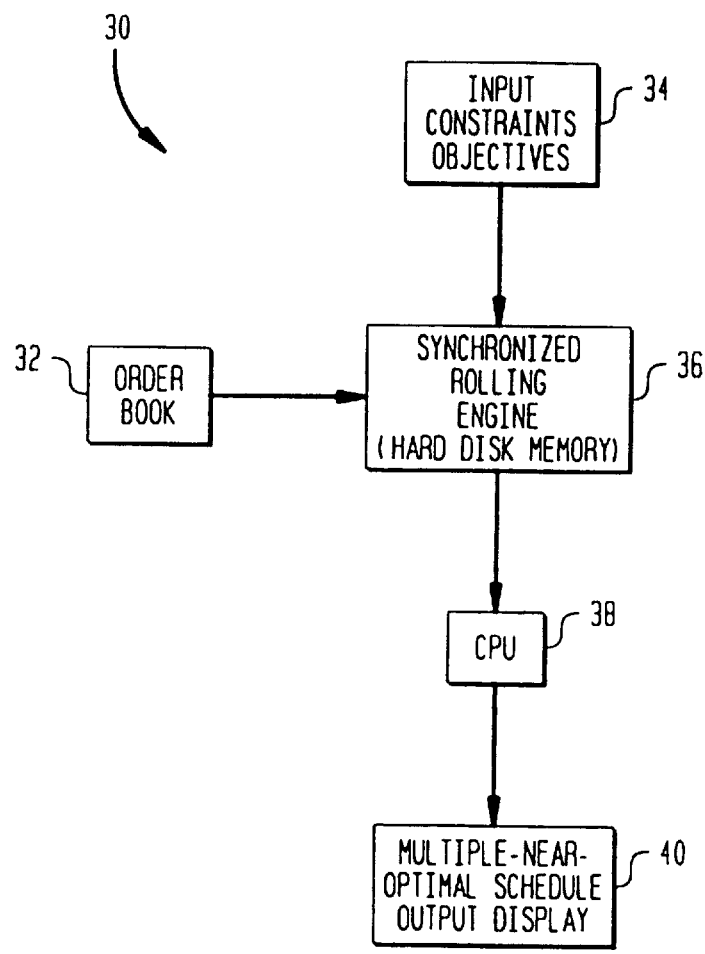
FIG. 6 shows a computer realization of the present invention.

Attention is now directed to FIG. 6, which shows a canonical digital computer 30 suitable for realization of the present invention. The computer 30 includes input means 32,34 comprising order book and constraint objectives, respectively; a hard disk memory 36 comprising a synchronized steel rolling engine; a central processing unit 38 for execution of the engine; and, an output display 40 for displaying multiple, near-optimal schedules.

We claim:

1. A scheduling method suitable for use in primary steel production utilizing either hot charge or direct hot charge rolling modes comprising a continuous caster for input of slabs to a hot strip mill, the method comprising creating both a continuous caster schedule and a hot strip mill schedule by grouping orders for the hot strip mill on the basis of attributes that allow the continuous caster and the hot strip mill to process and roll slabs with minimal interruption while respecting constraints particular to said continuous caster and said hot strip mill.

2. A method according to claim 1, wherein the attributes are selected from a group consisting of at least one of: order number, priority, metallurgical grade, eligible round types, hotband gauge, hot band width, and number of slabs.

3. A method according to claim 1, wherein respecting constraints particular to said continuous caster and said hot strip mill include requiring that pieces within a round are sequenceable at the hot strip mill without violating width of gauge change limits between consecutive pieces while keeping the same sequence as they are produced on the continuous caster.

4. A method according to claim 1, further comprising a step of creating the continuous caster schedule and the hot strip mill schedule directly from an order book.

5. A method according to claim 4, comprising a step of dynamically referring to and updating the order book for finding multiple, near-optimal synchronized rolling schedules.

6. A method according to claim 1, comprising implementing the steps in a digital computer.

7. A method according to claim 1, wherein creating a caster schedule and a hot strip mill schedule further comprises:

partitioning orders by cast grade;

generating segments from orders;

building heat sequences from orders;

building rounds from heat sequences;

generating round sequences from rounds;

generating caster strings from round sequences; and generating schedules from round sequences.

8. A method according to claim 1, wherein said creation of the continuous caster schedule and the hot strip mill schedule considers the objectives of maximizing throughput, maximizing on-time delivery, and minimizing operating costs.

* * * * *